US 9,135,758 B2

(12) United States Patent
Giraud

(10) Patent No.: US 9,135,758 B2
(45) Date of Patent: Sep. 15, 2015

(54) VEHICLE STATUS NOTIFICATION AND OPERATOR IDENTIFICATION

(71) Applicant: MOJ.IO Inc., North Vancouver (CA)

(72) Inventor: Damon Giraud, North Vancouver (CA)

(73) Assignee: MOJ.IO INC., Vancouver (CA)

(*) Notice: Subject to any disclaimer, the term of this patent is extended or adjusted under 35 U.S.C. 154(b) by 0 days.

(21) Appl. No.: 14/274,950

(22) Filed: May 12, 2014

(65) Prior Publication Data

US 2014/0333425 A1 Nov. 13, 2014

Related U.S. Application Data

(60) Provisional application No. 61/822,576, filed on May 13, 2013.

(51) Int. Cl.
*G08B 1/08* (2006.01)
*G07C 5/00* (2006.01)

(52) U.S. Cl.
CPC ........................................ *G07C 5/008* (2013.01)

(58) Field of Classification Search
CPC ......... H04W 4/02; H04W 4/027; H04W 4/04; H04W 4/046; H04M 1/72563; H04M 1/72577; G07C 5/008
USPC .................. 340/539.11, 539.13, 573.1, 573.4, 340/426.1, 541, 565–567, 576; 455/404.1, 455/404.2, 414.1, 422.1, 435.1, 456.1, 90.1, 455/345
See application file for complete search history.

(56) References Cited

U.S. PATENT DOCUMENTS

| | | |
|---|---|---|
| 2006/0095199 A1 | 5/2006 | Lagassey |
| 2006/0271246 A1 | 11/2006 | Bell et al. |
| 2007/0156311 A1 | 7/2007 | Elcock et al. |
| 2010/0210254 A1 | 8/2010 | Kelly et al. |
| 2010/0280711 A1* | 11/2010 | Chen et al. .................. 455/41.2 |
| 2011/0029644 A1 | 2/2011 | Gelvin et al. |
| 2011/0133952 A1* | 6/2011 | McNamara et al. ......... 455/41.2 |
| 2011/0153367 A1 | 6/2011 | Amigo et al. |
| 2011/0273568 A1 | 11/2011 | Lagassey |
| 2012/0079149 A1 | 3/2012 | Gelvin et al. |
| 2012/0088462 A1* | 4/2012 | Mader et al. ................ 455/161.1 |
| 2012/0101855 A1 | 4/2012 | Collins et al. |
| 2013/0024060 A1 | 1/2013 | Sukkarie et al. |
| 2013/0060583 A1 | 3/2013 | Collins et al. |
| 2013/0079964 A1 | 3/2013 | Sukkarie et al. |
| 2013/0190967 A1 | 7/2013 | Hassib et al. |
| 2013/0282925 A1 | 10/2013 | Cawse et al. |
| 2013/0289819 A1 | 10/2013 | Hassib et al. |
| 2014/0096217 A1 | 4/2014 | Lehmann |
| 2014/0187219 A1* | 7/2014 | Yang et al. .................... 455/418 |
| 2014/0281470 A1* | 9/2014 | Detter et al. .................. 713/100 |

* cited by examiner

*Primary Examiner* — Thomas Mullen
(74) *Attorney, Agent, or Firm* — Michael J. Andri

(57) ABSTRACT

A computing system located on-board a vehicle issues an event notification responsive to detection of an event condition. The on-board computing system detects the presence of wireless-enabled devices located within the vehicle or within proximity to the vehicle over a wireless communications link. The on-board computing system seeks to determine the identity of one or more persons that enter, attempt to enter, or operate the vehicle based on identifiers obtained from one or more wireless-enabled devices carried by those persons. The on-board computing system distinguishes multiple users from each other by designating one user as the vehicle operator, and one or more other users as passengers of the vehicle. The on-board computing system may include a removable on-board interface device that interfaces with an on-board vehicle control system.

20 Claims, 7 Drawing Sheets

VEHICLE STATUS NOTIFICATION AND OPERATOR IDENTIFICATION

CROSS REFERENCE TO RELATED APPLICATIONS

This application claims priority to U.S. Provisional Application No. 61/822,576, filed May 13, 2013, the entirety of which is incorporated herein by reference.

BACKGROUND

Many modern vehicles include on-board electronic control systems that manage and record operation of the vehicle's various subsystems. On-board electronic control systems may include or otherwise support on-board diagnostic (OBD) services that enable vehicle owners and repair technicians to access diagnostic information or other forms of operational information from the control system. As one example, on-board electronic control systems may be accessed via a data interface in the form of a physical wired data link connector or data port, such as ALDL, OBD-I, OBD-1.5, OBD-II, or other suitable data interface.

SUMMARY

A computing system located on-board a vehicle issues an event notification responsive to detection of an event condition. The event condition may include or take the form of an auditory event and/or a motion event detected by the on-board computing system of the vehicle. The event notification may be directed to a designated point of contact associated with the on-board computing system and/or vehicle. The on-board computing system may additionally or alternatively initiate scanning for wireless-enabled devices responsive to detection of an event condition.

The on-board computing system detects the presence of wireless-enabled devices located within the vehicle or within wireless proximity to the vehicle over a wireless communications link. The on-board computing system seeks to determine the identity of one or more persons that enter, attempt to enter, or operate the vehicle based on identifiers obtained from one or more wireless-enabled devices carried by those persons. If available, the on-board computing system retrieves profile information associated with the identifier. Profile information retrieved by the on-board computing system may indicate an operating configuration to be applied and used by the on-board computing system and/or a network service during vehicle operation. If the identifier is not associated with profile information of a registered user account, the on-board computing system or a network service may initiate a registration process for the identifier and/or may direct an event notification to a designated point of contact associated with the on-board computing system and/or vehicle.

The on-board computing system distinguishes multiple users from each other by designating one user as the vehicle operator, and one or more other users as passengers of the vehicle. Upon detection of multiple wireless-enabled devices, the on-board computing system may direct one or more of the wireless-enabled devices to prompt their respective users for an indication of vehicle operator status, which may be received and processed by the on-board computing system and/or by a server system hosting a network service (e.g., in the 'cloud') that is in communication with the wireless-enabled device and/or on-board computing system. The status of each user, as either a vehicle operator or passenger, may define or otherwise influence the operating configuration of the on-board computing system, and its associated functions enabled or otherwise supported by one or more applications executed at a network service (e.g., in the 'cloud').

The on-board computing system may take the form of a removable or integrated interface device (e.g., computing device) located on-board the vehicle that communicates with an on-board vehicle control system. A removable on-board interface device may communicate with the on-board vehicle control system via a wired or wireless data link. A wired data link may be provided by the on-board interface device through a hardware connector that interfaces with a data port of the on-board vehicle control system. The on-board interface device may include one or more wireless transceivers for communicating with wireless-enabled devices and/or a network service, a computing device, an interface for communicating with the on-board vehicle control system, and one or more sensors for detecting motion and/or auditory events.

This summary includes only some of the concepts disclosed in greater detail by the following detailed description and associated drawings. As such, claimed subject matter is not limited to the contents of this summary.

DETAILED DESCRIPTION

Figure 1:
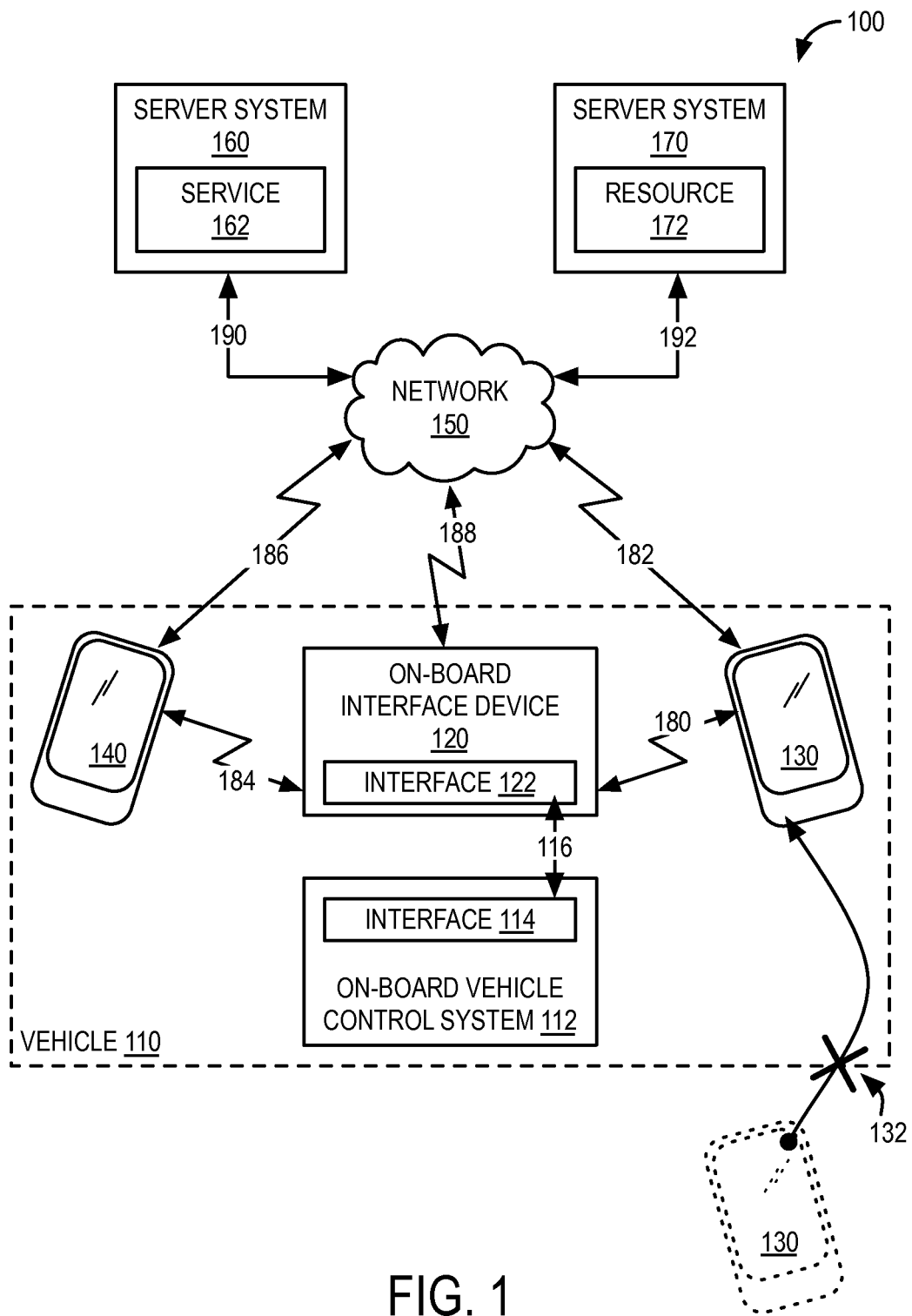
FIG. 1 is a schematic diagram depicting an example computing environment.

A computing system located on-board a vehicle supports several aspects of the present disclosure that may be utilized alone or in combination to provide an enhanced user experience for vehicle owners, operators, and/or passengers.

In one aspect of the present disclosure, a computing system located on-board a vehicle issues an event notification responsive to detection of an event condition. The event condition may include or take the form of an auditory event and/or a motion event detected by the on-board computing system of the vehicle. The event notification may be directed to a designated point of contact associated with the on-board computing system and/or vehicle. The on-board computing system may additionally or alternatively initiate scanning for wireless-enabled devices responsive to detection of an event condition.

In another aspect of the present disclosure, the on-board computing system detects the presence of wireless-enabled devices located within the vehicle or within wireless proximity to the vehicle over a wireless communications link. The on-board computing system seeks to determine the identity of one or more persons that enter, attempt to enter, or operate the vehicle based on identifiers obtained from one or more wireless-enabled devices carried by those persons. If available, the on-board computing system retrieves profile information associated with the identifier. Profile information retrieved by the on-board computing system may indicate an operating configuration to be applied and used by the on-board computing system during vehicle operation. If the identifier is not associated with profile information of a registered user account, the on-board computing system may initiate a registration process for the identifier and/or may direct an event notification to a designated point of contact associated with the on-board computing system and/or vehicle.

In yet another aspect of the present disclosure, the on-board computing system distinguishes multiple users from each other by designating one user as the vehicle operator, and one or more other users as passengers of the vehicle. Upon detection of multiple wireless-enabled devices, the on-board computing system may direct one or more of the wireless-enabled devices to prompt their respective users for an indication of vehicle operator status, which may be received and processed by the on-board computing system and/or by a server system hosting a network service (e.g., in the 'cloud') that is in communication with the wireless-enabled device and/or on-board computing system. The status of each user, as either a vehicle operator or passenger, may define or otherwise influence the operating configuration of the on-board computing system, and its associated functions enabled or otherwise supported by one or more applications executed at a network service (e.g., in the 'cloud').

The on-board computing system of the present disclosure may take the form of a removable or integrated interface device (e.g., computing device) located on-board the vehicle that communicates with an on-board vehicle control system. A removable on-board interface device may communicate with the on-board vehicle control system via a wired or wireless data link. A wired data link may be provided by the on-board interface device through a hardware connector that interfaces with a data port of the on-board vehicle control system. The on-board interface device may include one or more wireless transceivers, a computing device, an interface for communicating with the on-board vehicle control system, and one or more sensors for detecting motion and/or auditory events.

While the disclosed subject matter is directed to a vehicle-based implementation, it will be understood that aspects of the disclosed subject matter may be used outside of a vehicle context, such as within buildings, building systems, or on-board non-moveable machinery.

FIG. 1 is a schematic diagram depicting an example computing environment 100. Within computing environment 100, a vehicle 110 includes an on-board vehicle control system 112 that manages and records operation of the vehicle's various subsystems. Vehicle 110 may take the form of a passenger vehicle, a work vehicle, or other suitable vehicle type. For example, vehicle 110 may take the form of a land-based wheeled or track vehicle (e.g., car, truck, bus, tractor, train, locomotive, motorcycle, snowmobile, etc.), an aircraft (e.g., airplane, helicopter, etc.), a marine vessel (e.g., boat or personal watercraft), or other suitable vehicle type.

Vehicle 110 is further depicted as including an on-board interface device 120. In one implementation, on-board interface device 120 may take the form of an aftermarket computing device that is installed by a vehicle owner, operator, or technician after purchase of the vehicle or at the time of purchase of the vehicle. In another implementation, on-board interface device 120 may form part of and/or be integrated with on-board vehicle control system 112.

On-board interface device 120 and on-board vehicle control system 112 may collectively form an on-board computing system. On-board interface device 120 includes a data interface 122 for communicating with on-board vehicle control system 112 or portions thereof via a data interface 114 of control system 112. Such communications, indicated schematically by communication flow 116, may be bidirectional between on-board interface device 120 and vehicle control system 112, or may be unidirectional from on-board vehicle control system 112 to on-board interface device 120. As one example, data interface 114 of on-board vehicle control system 112 may take the form of a hardware data link connector or data port, such as ALDL, OBD-I, OBD-1.5, OBD-II, or other suitable data interface. Data interface 122 of on-board interface device 120 may take the form of a hardware data link connector or data port that corresponds to and mates with interface 114. On-board interface device 120 may be physically added to and/or removed from interfacing with on-board vehicle control system 112 at the boundary of data interfaces 114 and 122. In another implementation, communication flow 116 may take the form of a wireless communications link between data interface 114 and data interface 122. In this implementation, these data interfaces may include wireless transceivers and associated electronic components supporting one or more wireless communications protocols.

Additional aspects of on-board interface device 120 will be described in greater detail with reference to FIG. 7. Briefly, however, on-board interface device 120 may take the form of a computing device that is capable of communicating wirelessly with a variety of other computing devices. For example, FIG. 1 depicts example wireless communications between on-board interface device 120 and one or more other computing devices, such as mobile computing device 130 indicated by communication flow 180, mobile computing device 140 as indicated by communication flow 184, and various other computing devices connected to communications network 150 as indicated by communication flow 188.

A mobile computing device may include or take the form of a wireless-enabled portable electronic device (referred to as wireless device) such as a smartphone, a tablet computer, a notebook or laptop computer, a wearable computing device in the form of glasses or a wristwatch, etc. A service-enabled mobile computing device may take the form of a general-purpose mobile computing device on which an application program operates that is paired with or configured for use with the on-board interface device (e.g., on-board interface 120) and/or a network service 162.

Wireless communications may take the form of relatively short-range wireless communications over a personal area network using the Bluetooth wireless communication protocol or other suitable wireless communication protocol. For example, communication flows 180 and 184 depicted in FIG. 1 may take the form of relatively short-range wireless communications over a personal area network using the Bluetooth wireless communication protocol or other suitable personal area network protocol. In the context of example computing environment 100, mobile computing devices 130 and 140 are depicted as being physically within/on-board vehicle 110 and/or within a relatively short range of on-board interface device 120 to enable wireless communications with on-board interface device 120 over a direct wireless link. However, it will be understood that wireless communications between on-board interface device 120 and mobile computing devices may be provided over a local area network and/or a wide area network using other suitable protocols, and may traverse one or more intermediate networking devices and/or access points.

Wireless communications may alternatively or additionally take the form of relatively long-range wireless communications over a wide area network and/or a local area network using cellular or other suitable communication protocols, such as 3G UMTS protocols as defined by the 3GPP standards body, 4G LTE protocols as defined by the 3GPP standards body, Wi-Fi 802.11 protocols as defined by IEEE, Wi-Max 802.16 protocols as defined by IEEE, or other suitable wireless communication protocols. For example, communication flows 188, 186, and 182 depicted in FIG. 1 in association with communications network 150 may take the form of relatively long-range wireless communications using one or more wireless communication protocols.

Communication network 150 may include or take the form of one or more wired and/or wireless communication networks. Network 150 may include one or more wide area networks such as the Internet, cellular backhaul networks, telephone networks, intermediate network devices, and edge devices such as wireless and/or wired access points, etc.

Computing environment 100 of FIG. 1 further includes server system 160 that hosts a network service 162. Server system 160 may include one or more server devices that are co-located and/or geographically distributed. Service 162 may take the form of a web service that is accessible over at least an Internet protocol portion of communications network 150. Service 162 may support a programming interface, such as an API through which other computing devices and/or software modules of computing environment 100 may obtain information, post information, access information, and/or communicate with service 162. FIG. 1 depicts an example communication flow 190 between server system 160 and communications network 150. Computing environment 100 of FIG. 1 may include additional computing devices, such as example server system 170 that hosts network resource 172. Network resource 172 may refer to any suitable form of information accessible on a network. FIG. 1 depicts an example communication flow 192 between server system 170 and communications network 150.

In at least some implementations, on-board interface device 120 may include one or more motion sensors for detecting and/or measuring motion and/or vibration, and/or may include one or more auditory sensors for detecting and/or measuring sound and/or vibration. In another implementation, on-board interface device 120 may obtain measurements of motion, vibration, and/or sound from one or more sensors associated with or forming part of on-board vehicle control system 112.

FIG. 1 further depicts a use-scenario in which a human operator (i.e., a user) of mobile computing device 130 enters vehicle 110 while carrying mobile computing device 130, indicated schematically at 132. For example, the user may approach the vehicle, operate a handle of a door of the vehicle, open the door, step inside the vehicle, and close the door behind the user. One or more of these activities by the user may cause or result in motion, vibration, and/or sound that is detected and/or measured by on-board interface device 120. In other examples, motion, vibration, and/or sound may result from objects striking, contacting, or moving the vehicle from an initial rest position. A variety of events may be detected or at least inferred from motion and/or auditory events (including vibration) measured by one or more sensors located on-board the vehicle. Further discussion of these sensor subsystems and event detection is provided with reference to FIGS. 2 and 7.

Figure 2:
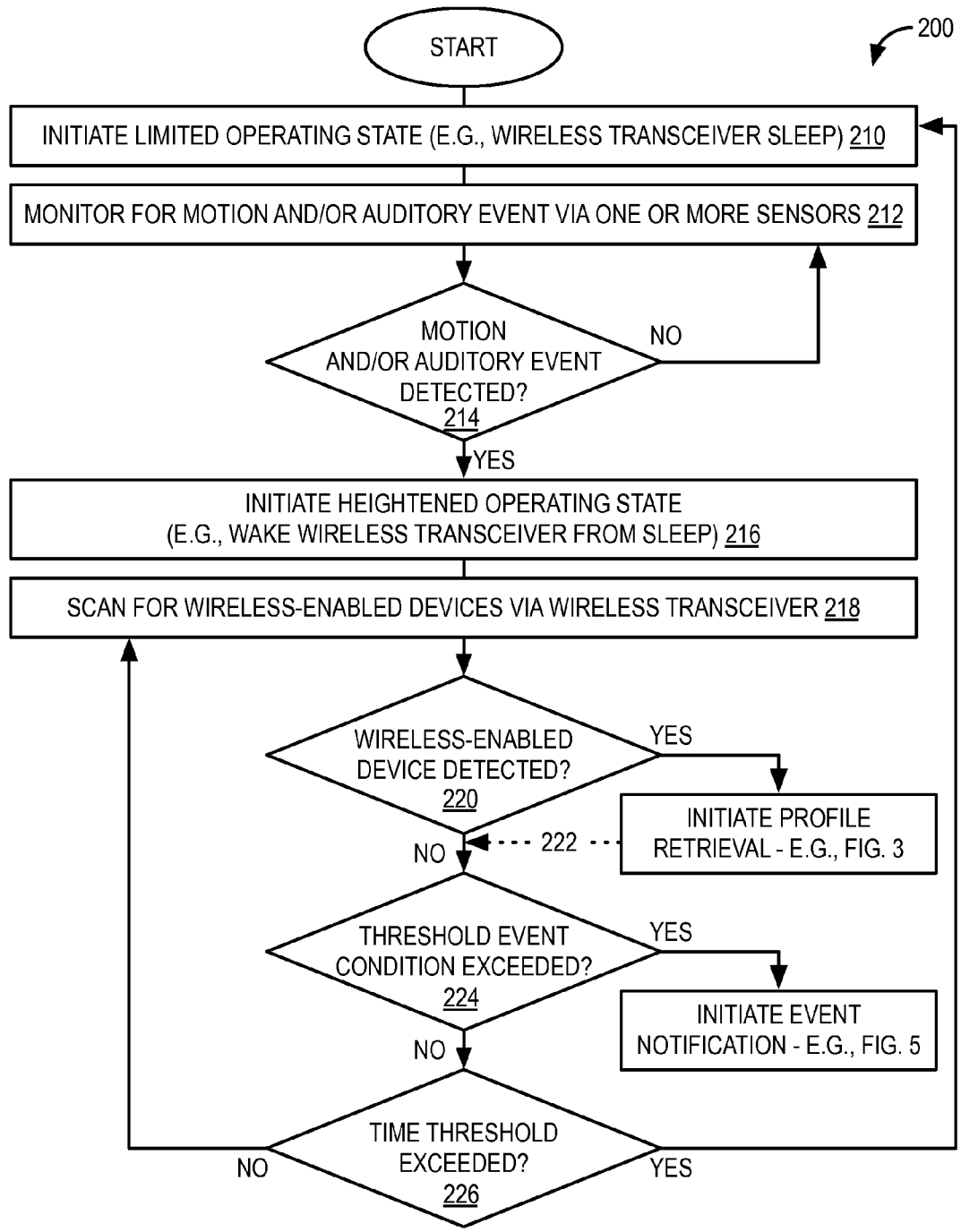
FIG. 2 is a flow diagram depicting an example method for event detection and/or wireless-enabled device detection.

FIG. 2 is a flow diagram depicting an example method 200 for event detection and/or wireless-enabled device detection. As one example, method 200 may be performed in whole or in part by an on-board interface device, such as previously described on-board interface device 120 of FIG. 1. As another example, method 200 may be performed in whole or in part by an on-board computing system that includes a combination of an on-board interface device (e.g., on-board interface device 120) and an on-board vehicle control system (e.g., on-board vehicle control system 112) or portion thereof.

At 210, the method includes initiating a limited operating state. For example, the limited operating state may include or take the form of a sleep state or a reduced power state of a wireless transceiver and/or associated electronic components that enable wireless communications. The wireless transceiver and associated electronic component may form part of an on-board interface device or an on-board computing system. The limited operating state may serve to reduce power consumption of the wireless transceiver and/or associated electronic components. In at least some implementations, the limited operating state may be utilized while the vehicle is at rest (e.g., parked) and the vehicle ignition is in the off position.

At 212, the method includes monitoring for motion and/or auditory events via one or more sensors. The one or more sensors may form part of the on-board interface device. Alternatively or additionally, the on-board interface device may receive sensor information indicating motion and/or auditory events from an on-board vehicle control system that includes the one or more sensors. For example, the one or more sensors of the vehicle control system may be utilized during vehicle operation for other purposes beyond the motion and/or auditory detection utilized with reference to method 200. In at least some implementations, the monitoring for motion and/or auditory events may be performed at least while the vehicle is at rest (at least initially at rest) and the vehicle ignition is in the off position.

Motion and/or auditory events (including vibration) may be the result of a change of state of a vehicle from an initial state (e.g., baseline or background noise state). For example, motion and/or auditory events may include an object striking, touching, changing the orientation of, or otherwise interacting with the vehicle while it is at rest. As one example, a motion event may include the vehicle being tilted to a different orientation as part of a towing operation, or being disturbed due to physical impact by another vehicle or object. As another example, an auditory event may include the breaking of a window of the vehicle or the opening/closing of the door of the vehicle.

At 214, if motion and/or an auditory event has been detected, the process flow may proceed to 216. If motion and/or auditory event has not been detected, the process flow may return to 212 where monitoring may continue. In at least some implementations, the process flow may proceed to 216 if the vehicle ignition is turned to an on position from an off position even if motion and/or an auditory event has not been detected prior to ignition.

At 216, the method includes initiating a heightened operating state responsive to detection of the motion and/or auditory event. For example, the wireless transceiver may be awakened from the limited operating state (e.g., a sleep state or reduced power state) to begin sending and/or receiving wireless signal transmissions or to increase power allocated to the sending and/or receiving of wireless signal transmissions. In another implementation, operations 212, 214, and 216 may be omitted, such as where event detection is not performed or where a limited operating state is not utilized.

At 218, the method includes scanning for the presence of wireless-enabled devices via the wireless transceiver. The wireless transceiver may utilize any suitable wireless communications protocol to scan for the presence of one or more wireless-enabled devices that operate according to that wireless protocol. As one example, the wireless communications protocol may take the form of a relatively short-range wireless communications protocol, such as Bluetooth. However, other suitable wireless communications protocols may be used. The on-board interface device may scan for mobile computing devices within the wireless range of its wireless transceiver, including mobile computing devices within the vehicle or located external yet within wireless range to the vehicle.

Figure 3:
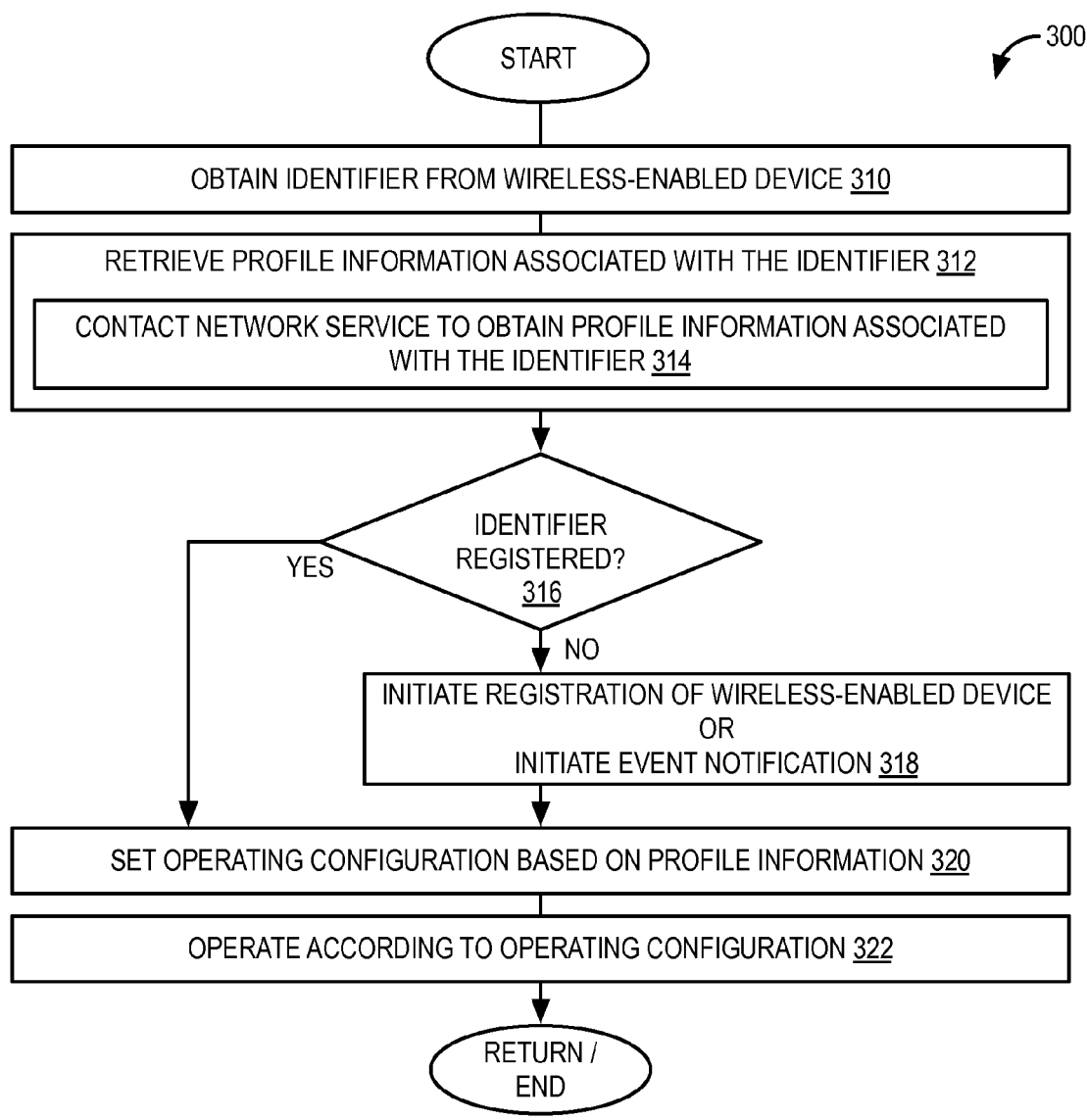
FIG. 3 is a flow diagram depicting an example method for profile retrieval.

At 220, if one or more wireless-enabled devices have been detected, then profile retrieval may be initiated. FIG. 3 provides an example method for profile retrieval. Briefly, identifiers received from wireless-enabled devices may be associated with a user or user account that has previously registered with the on-board interface device or with a network service associated with the on-board interface device. The on-board interface device and/or the network service may maintain a user account for each registered user, including profile information associated with each user account. Unregistered users may be unregistered with respect to a particular on-board interface device and/or vehicle, or may be unregistered with respect to any on-board interface device and/or vehicle. A network service may maintain a master list of registered users, including their respective user accounts, while individual on-board interface devices may maintain a limited list of registered users associated with that particular on-board interface device and/or vehicle.

In at least some implementations, a registered user may be classified as either a primary registered user or a secondary registered user. The primary registered user may hold administrative privileges that enable the primary registered user to add or remove secondary registered users from association with a particular on-board interface device and/or vehicle. Often, the primary registered user is the owner and primary operator of the on-board interface device and vehicle. However, other users may be classified as the primary registered user.

Depending on the result of profile retrieval, the process flow may proceed, as indicated at 222, to 224. In some examples, method 200 may be discontinued if profile retrieval is successful or if a particular registered user has been detected (e.g., the primary registered user). If one or more wireless-enabled devices have not been detected, then the process flow may proceed to 224. In at least some implementations, filtering of detected wireless-enabled devices may be performed at 220 based on measured wireless signal strength to exclude one or more wireless-enabled devices from consideration that exhibit less than a threshold wireless signal strength. It will be understood that any suitable filtering criteria may be established taking into account the capabilities of the wireless transceiver, such as range, power, etc. to provide a suitable indication of the presence of wireless-enabled devices within a defined vicinity of the wireless transceiver.

Figure 5:
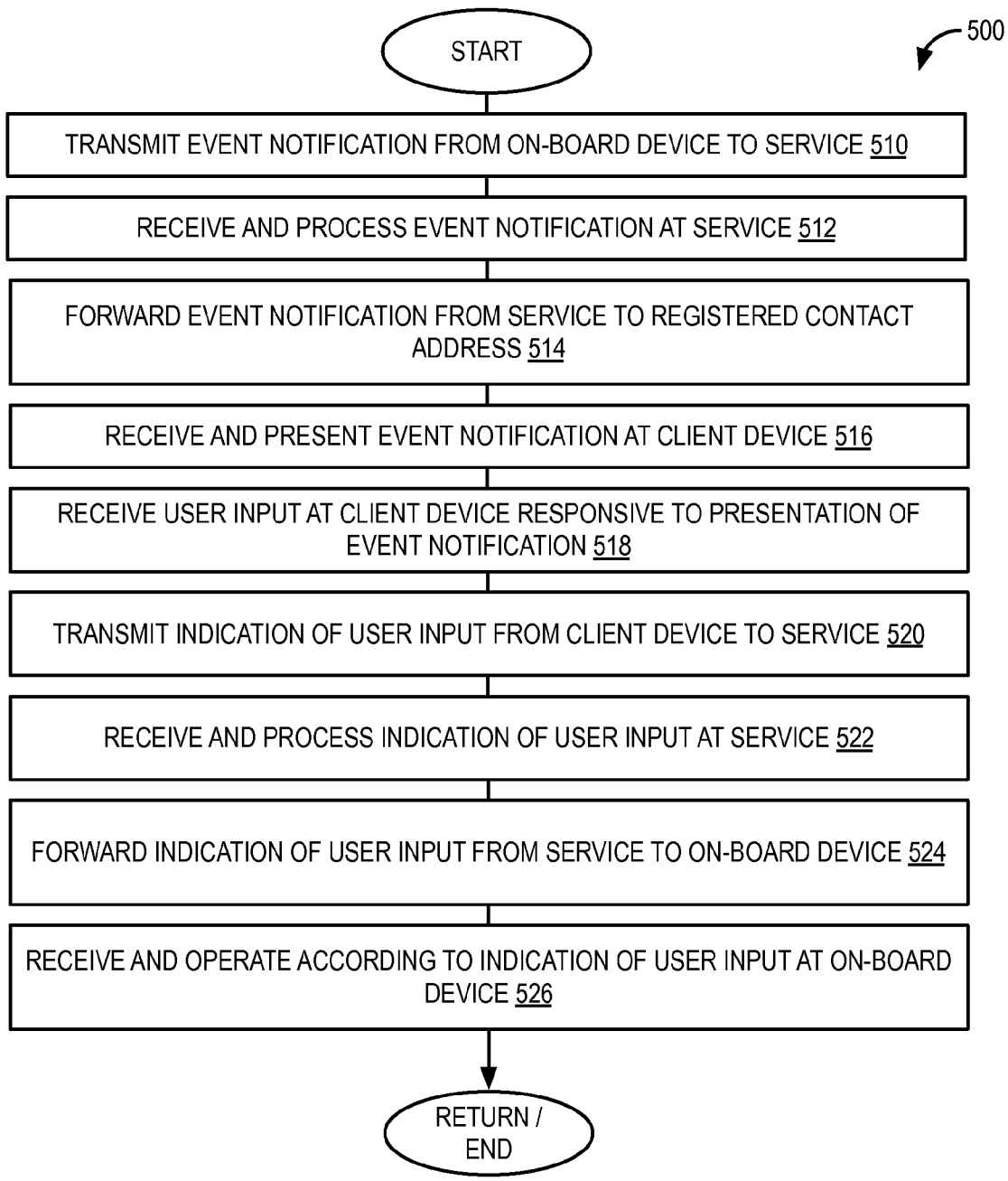
FIG. 5 is a flow diagram depicting an example method for event notification.

At 224, if a threshold event condition has been met or exceeded for the event detected at 214, then event notification may be initiated. FIG. 5 provides an example method for event notification. If the threshold event condition has not been met or exceeded, then the process flow may proceed to 226. Any suitable event condition may be used to filter motion and/or auditory events with respect to magnitude, type, and/or duration. Separate filters may be used for motion sensor information and for auditory sensor information. Such filtering may be used to exclude certain events from consideration, such as if determining whether to perform event notification or other suitable operation.

As one example, if one or more motion and/or auditory events is recognized by the on-board interface device to be an appropriate vehicle access event in which a door of the vehicle is opening and/or closing, the vehicle is presently off, the vehicle is registered as privately owned with only one primary registered user, and the presence of that user's mobile computing device has been detected (e.g., via scanning and profile retrieval), then event notification may not be performed. The user may continue operating the vehicle using the applications and associated data residing at the on-board interface device and/or the user's mobile computing device.

In another example, if one or more motion and/or auditory events is recognized by the on-board interface device to be a potentially inappropriate vehicle access event in which a door of the vehicle is opening and/or closing, the vehicle is presently off, the vehicle is registered as privately owned with only one primary registered user (or a limited set of registered users), and the mobile computing device of the registered user is not present (e.g., has not been detected via scanning and/or profile retrieval), then event notification may be performed in which a designated point of contact may be alerted (e.g., via a message transmitted and displayed at the registered user's mobile computing device or other suitable device) that there is an entry attempt in progress.

As additional examples, if a motion and/or auditory event is recognized by the on-board interface device to be a change in pitch of the vehicle while the vehicle is off, the disturbance may be interpreted as a towing event and an event notification may be transmitted to a registered point of contact. If a motion and/or auditory event is recognized by the on-board interface device to be a lateral impact while the vehicle is off, the disturbance may be interpreted as a crash or hit & run, and an event notification may be transmitted to a registered point of contact. If a motion and/or auditory event is recognized by the on-board interface device as a deployment of one or more airbags within the vehicle while the vehicle is off, the disturbance may be interpreted as a crash or hit & run, and an event notification may be transmitted to a registered point of contact. If a motion and/or auditory event is recognized by the on-board interface device as a shattering type of impact (e.g., glass shattering) while the vehicle is off, then the disturbance may be interpreted as a window of the vehicle being smashed or shattered, and an event notification may be transmitted to a registered point of contact.

At 226, if a time threshold has been met or exceeded for a time duration since a previously detected event, then the process flow may return to 210 where the limited operating state may be initiated or reinitiated. If the time threshold has not been met or exceeded for the time duration since a previously detected event, then the process flow may return to 218 where scanning for the presence of wireless-enabled devices may be performed or continued. The time threshold may take any suitable value (e.g., seconds, minutes, hours, etc.), and may balance considerations of power consumption and wireless monitoring.

FIG. 3 is a flow diagram depicting an example method 300 for profile retrieval. As one example, method 300 may be performed in whole or in part by an on-board interface device, such as previously described on-board interface device 120 of FIG. 1. As another example, method 300 may be performed in whole or in part by an on-board computing system that includes a combination of an on-board interface device (e.g., on-board interface device 120) and an on-board vehicle control system (e.g., on-board vehicle control system 112) or portion thereof.

At 310, the method includes obtaining an identifier from a wireless-enabled device over a wireless communications link via a wireless transceiver. The wireless communications link may be provided over a wireless local area network or a wireless personal area network. An identifier may take the form of a unique identifier (e.g., at least unique within a domain of identifiers) of a wireless-enabled device, and may include a hardware identifier, a software identifier, a firmware identifier, a network assigned identifier, or other suitable identifier. Example identifiers include a MAC address, an international mobile subscriber identity (IMSI), an identifier associated with an application program operating at or residing at a wireless-enabled device, or other suitable identifier that enables wireless-enabled devices to be distinguished from each other on a network. If two or more wireless-enabled devices are present and/or have been detected, then method 400 of FIG. 4 may be performed as an alternative to method 300 or in combination with method 300.

At 312, the method includes retrieving profile information associated with the identifier or an indication of the identifier. An indication of an identifier may include a processed or augmented form of the identifier, or may include an alternative identifier that is associated with the identifier in a database system of a data store. Profile information may be retrieved from a local data store and/or from a remote data store. The local data store may reside in a storage subsystem of the on-board interface device. With regards to the remote data store, the method at 314 includes contacting a network service to obtain profile information associated with the identifier. For example, the on-board interface device may report detection of a wireless device to a network service hosted at a remote server system by transmitting the identifier or an indication of the identifier over a wireless wide area network.

In some scenarios, a wireless-enabled device may transmit an identifier to the on-board interface device that has been previously registered with a service. In such case, the registered identifier may be associated with profile information stored locally at the on-board interface device and/or remotely at a server operated by or accessible to the service. In another scenario, a wireless-enabled device may transmit an identifier to the on-board interface device that has not been previously registered with the service. In such case, the registered identifier may not be associated with profile information. At 316, if the identifier is registered, then the process flow proceeds to 320. If the identifier is not registered, the process flow proceeds to 318.

At 318, the method includes one or more of initiating registration of the wireless-enabled device and/or initiating event notification. In at least some implementations, event notification may be initiated for the purpose of obtaining permission from an account holder (e.g., primary registered user) associated with a registered profile to initiate registration of the unregistered identifier. For example, the on-board interface device may be associated with an administrator, owner, or master account holder. In this implementation, the on-board interface device may transmit a request message to or directed at the account holder over a wireless network to obtain permission prior to initiating registration of the unregistered identifier. In another implementation, registration of the unregistered identifier may be initiated without initiating event notification. In yet another implementation, event notification may be initiated without initiating registration of the unregistered identifier. An example of event notification is described in further detail with reference to FIG. 5.

At 320, the method includes setting an operating configuration at the on-board interface device and/or at a network service hosted at a server system based on the profile information associated with the identifier. Setting an operating configuration may include one or more of: (1) setting user preferences associated with the registered identifier as indicated by the profile information, (2) executing one or more application programs at the on-board interface device and/or at the network service as indicated by the profile information associated with the registered identifier, (3) initiating a reporting operation or communication session (e.g., including pre-specified forms of information) between one or more of the on-board interface device, the wireless-enabled device associated with the registered identifier, and/or the network service over one or more wireless communication links, (4) initiating a reporting operation or communication session (e.g., including pre-specified forms of information) between the on-board interface device and a network service over a wireless communication link in which the registered identifier is reported with messages exchanged between the network service and the on-board interface device, (5) initiating a particular control operation with respect to an on-board vehicle control system communicating with the on-board interface device, (6) storing specific forms of information obtained by the on-board interface device from the on-board vehicle control system.

At 322, the method includes operating according to the operating configuration set at 320. Such operations may include executing instructions at the on-board interface device or on-board computing system to perform one or more operations, process, or tasks, and exchanging communications with one or more wireless-enabled devices, a network service, and/or an on-board vehicle control system. Such operations may further include executing instructions at the network service to perform one or more operations, processes, or tasks, and exchanging communications with the on-board interface device and/or wireless-enabled devices via one or more wireless communication links.

In at least some implementations, when an account holder who is not a registered user of the vehicle that is being entered, and that vehicle is registered with the on-board interface device and/or network service as a rental/fleet/shared vehicle by the primary registered user or owner, then primary registered user or owner may transmit an authorization to the on-board interface device and/or to a paired application program operating at a wireless-enabled device that indicates that the user of the wireless-enabled device is authorized to enter and/or operate the vehicle, so as to ensure the vehicle is not entered or operated by unauthorized individuals (at least without event notifications being issued to the primary registered user or owner).

As a non-limiting example, as part of operations 320 and/or 322, the on-board interface device may associate data received from an on-board vehicle control system with a user account associated with an identifier of a detected wireless device or an indication of the identifier. Alternatively or additionally, the on-board interface device may initiate association of the data with the user account by reporting the data to a network service hosted at a remote server system, and the network service may associate the data with the user account in a data store of the remote server system. Data reported by the on-board interface device may include a processed form of the data received from the vehicle control system.

Figure 4:
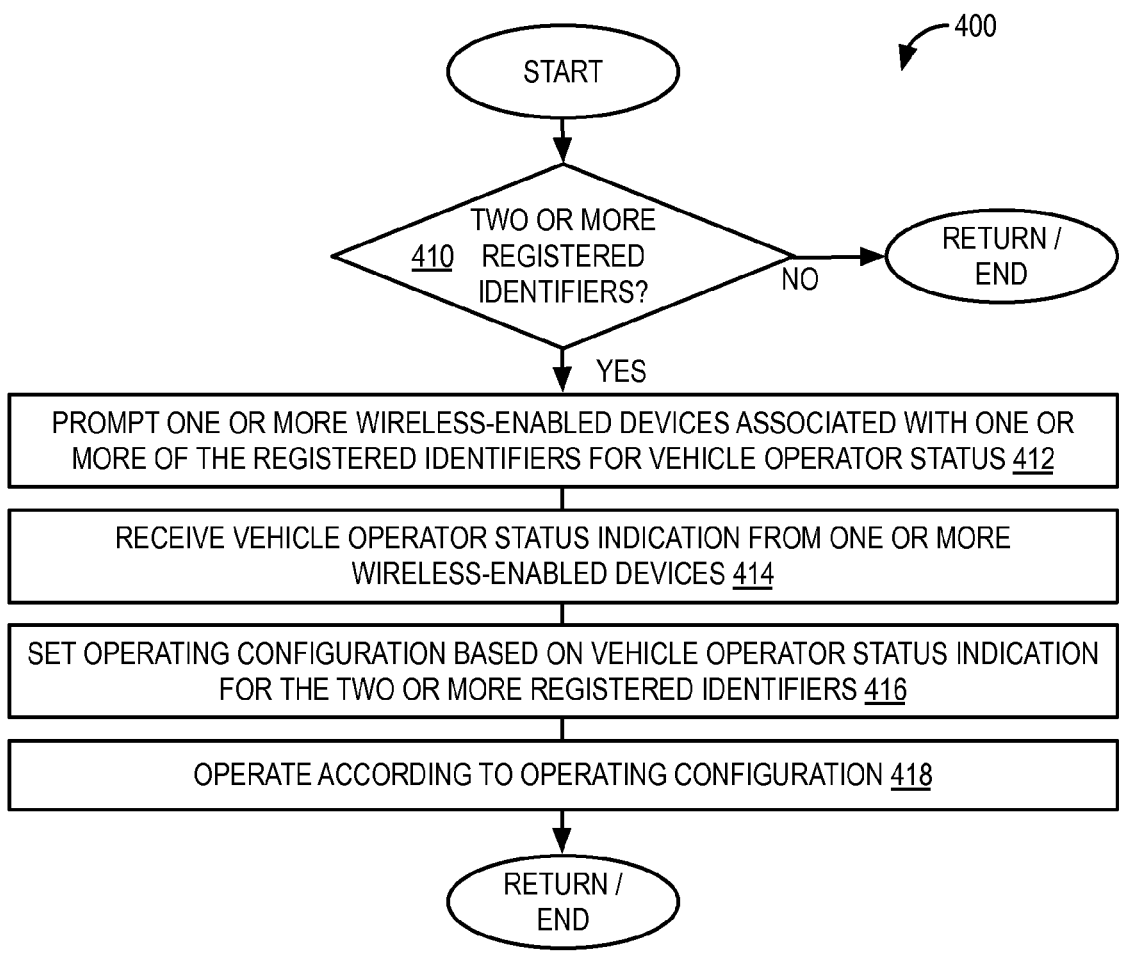
FIG. 4 is a flow diagram depicting an example method for identifying an operating configuration responsive to detection of two or more wireless-enabled devices.

FIG. 4 is a flow diagram depicting an example method 400 for identifying an operating configuration responsive to detection of two or more wireless-enabled devices. As one example, method 400 may be performed in whole or in part by an on-board interface device, such as previously described on-board interface device 120 of FIG. 1. As another example, method 400 may be performed in whole or in part by an on-board computing system that includes a combination of an on-board interface device (e.g., on-board interface device 120) and an on-board vehicle control system (e.g., on-board vehicle control system 112) or portion thereof.

At 410, the method includes determining whether two or more registered identifiers are present based on identifiers communicated to the on-board interface device by wireless-enabled devices. As one example, a wireless device may be detected as being present contemporaneously with one or more other wireless devices. As previously discussed with reference to FIG. 3, detection of unregistered users may result in registration of those users or devices and/or may result in event notification. If two or more registered identifiers are not present, the process flow may return or end, and/or the process flow of FIG. 3 may be performed. If two or more registered identifiers are present, the process flow may proceed to 412.

At 412, the method includes prompting one or more wireless-enabled devices associated with one or more of the registered identifiers for vehicle operator status. Such prompting may include transmitting a message from the on-board interface device to the one or more wireless-enabled devices over a wireless communications link. In some examples, this message may traverse an intermediate network service, while in other examples the message may be communicated directly via a local area network or a personal area network established with each wireless device. The message may be received by a wireless-enabled device, and may be formatted to cause the wireless-enabled device (e.g., in combination with an application program operating at the wireless-enabled device) to present a prompt to a user via a graphical display. Prompting for vehicle operating status may include asking the user of the wireless-enabled device whether the user is an operator of the vehicle or a passenger of the vehicle. In at least some implementations, if two or more wireless-enabled devices are detected, but only a single registered identifier is detected, the wireless-enabled device associated with the registered identifier may be prompted for vehicle operator status.

At 414, the method includes receiving a vehicle operator status indication from one or more wireless-enabled devices over a wireless communication link. The indication received by the on-board vehicle interface may indicate which of the registered identifiers is or is not associated with the vehicle operator. Transmission of the vehicle operator status indication may be initiated by one or more wireless-enabled devices (e.g., in combination with an application program operating at the wireless-enabled device) responsive to a user providing a user input to the prompt.

A response from less than all of the wireless-enabled devices and/or registered identifiers may involve inference of vehicle operator status from the supplied responses. For example, if a first of two wireless-enabled devices indicates a passenger or non-operator status, then the other wireless-enabled device may be assigned a vehicle operator status. As another example, if a first of two wireless-enabled devices indicates a vehicle operator status, then the other wireless-enabled device may be assigned a passenger status. As yet another example, if a particular wireless-enabled device or identifier is associated with two different user accounts, then the response may indicate which user account is to be assigned the vehicle operator status. Inference may be used to assign vehicle operator status to a particular user account even if multiple wireless-enabled devices are present and/or multiple user accounts are associated with a particular identifier.

At 416, the method includes setting an operating configuration based on the vehicle operator status indication for the two or more registered identifiers. Setting an operating configuration for the two or more registered identifiers may include, for each of the two or more registered identifiers based on their respective vehicle operator status indications, one or more of: (1) setting user preferences associated with the registered identifier as indicated by the profile information for the assigned vehicle operator status, (2) executing one or more application programs at the on-board interface device and/or at the network service as indicated by the profile information associated with the registered identifier for the assigned vehicle operator status, (3) initiating a reporting operation or communication session (e.g., including pre-specified forms of information) between the on-board interface device, the wireless-enabled device associated with the registered identifier for the assigned vehicle operator status, and/or the network service over one or more wireless communication links, (4) initiating a reporting operation or communication session (e.g., including pre-specified forms of information) between the on-board interface device and a network service for the assigned vehicle operator status in which the registered identifier is reported with messages exchanged between the network service and the on-board interface device, (5) initiating a particular control operation with respect to a on-board vehicle control system communicating with the on-board interface device for the assigned vehicle operator status, (6) storing specific forms of information obtained by the on-board interface device from the on-board vehicle control system for the assigned vehicle operator status.

In at least some implementations, the status of vehicle operator with respect to aspects of the operating configuration may override the status of non-operator/passengers. For example, aspects of the operating configuration dealing with particular control operations of the vehicle may be limited to the vehicle operator at the exclusion of the non-operator/passenger. As another example, limited storage capacity and/or data link bandwidth may be used for communications associated with the vehicle operator rather than the non-operator/passenger. As yet another example, competing preferences or settings between two or more registered users may be weighted differently based on the status of vehicle operator vs. non-operator/passenger.

At 418, the method includes operating according to the operating configuration set at 416. Such operations may include executing instructions at the on-board interface device or on-board computing system to perform one or more operations, process, or tasks, and exchanging communications with one or more wireless-enabled devices, a network service, and/or an on-board vehicle control system. Such operations may further include executing instructions at the network service to perform one or more operations, processes, or tasks, and exchanging communications with the on-board interface device and/or wireless-enabled devices via one or more wireless communication links.

The use of methods 300 and/or 400 may address one or more of the problems associated with the ability for multiple account holders to interact or be associated with an on-board computing system for a vehicle by determining the identity of the vehicle operator from among the multiple account holders, and to configure the driving experience to the applications and preferences of the person operating the vehicle. Aspects of methods 200, 300, and/or 400 also address the problem of capturing behavior data of the vehicle operator for the appropriate user account, despite whether or not the vehicle is registered to the vehicle operator. This may be specifically useful in scenarios where a young driver uses his or her parent's vehicle in which data logged by the on-board computing system should distinguish among each vehicle operator for the benefit of the insurance company who is underwriting the risk profile of that vehicle/policy holder.

In at least some implementations, a vehicle operator's identity may persist at the on-board computing system until that user or another user changes the identity of the vehicle operator. In another implementation, the vehicle operator's identity may be reset to a default user (e.g., a primary registered user) at the conclusion of vehicle operation and/or if a wireless-enabled device attributed to the last vehicle operator is carried outside of wireless range of the on-board computing system. In yet another implementation, a user identified as a vehicle operator may provide a specified time that the user will be operating the vehicle. Upon conclusion of the specified time or at the conclusion of the current vehicle operation following the specified time, the vehicle operator's identity may be reset to a default user.

FIG. 5 is a flow diagram depicting an example method 500 for event notification. As one example, method 500 may be performed by a combination of an on-board interface device or an on-board computing device, a network service, and a client computing device.

At 510, the method includes transmitting event notification from an on-board interface device a wireless communications network. An event notification may indicate one or more of an identity of the on-board interface device (e.g., an identifier or indication of an identifier of the on-board interface device), an identity of the vehicle, an identity of a user account registered with the on-board interface device and/or vehicle, and/or the identities of one or more wireless-enabled devices (e.g., an identifier of each wireless device or indication of the identifier) detected as being present at the vehicle. An event notification may further indicate a type of event that was detected at the vehicle by the on-board interface device (e.g., appropriate entry event, towing event, lateral impact event, forward or rearward impact event, window shattering event, etc.) and/or additional information describing the event. For example, a number of G-forces measured via an accelerometer on-board the vehicle may indicate a severity of an impact to the vehicle that may be communicated as part of an event notification. An event notification may further indicate a registration request for an unregistered identifier of a wireless-enabled device and/or a prompt message for initiating a prompt at a client computing device (e.g., for the point of contact) to obtain additional information or permission from a registered user.

The event notification may be transmitted to the point of contact registered with the on-board interface device, or may be transmitted to a network service that maintains the point of contact for an identifier of the on-board interface device and/or vehicle identity contained within the event notification.

At 512, the method includes receiving and processing the event notification at the service. For example, the service may be hosted at server system that receives the event notification, and processes the event notification according to a predetermined process defined by an account owner associated with the identity of the on-board interface device, identity of the vehicle, or the registered identifier indicated by the event notification message. Such processing may include filtering messages, augmenting messages with additional content or less content, forwarding aspects of the message to another network device, and/or storing messages in a data store.

At 514, the method includes forwarding the event notification from the service to a registered contact address for the registered identifier. The registered contact address may include an email address, a telephone number, or other suitable network address. The event notification may be forwarded to the registered contact address in original form or in a processed form. The event notification may be forwarded to the registered contact address as an email message, an SMS message, an automated voice call, or other suitable message.

At 516, the method includes receiving and presenting the event notification at a client device. The client device may display or otherwise present the event notification to a user responsive to receiving the event notification. In at least some implementations, an application program operating at the client device may be configured to receive and present notification messages that are received from the service or from on-board interface device.

At 518, the method includes receiving user input at the client device responsive to presentation of the event notification. The user may provide a user input to indicate a user selection or control input of the user. The user input may be provided via an application program operating at the client device.

At 520, the method includes transmitting an indication of the user input from the client device to the service over a communication network. Alternatively, the indication may be transmitted to the on-board interface device that bypasses the service.

At 522, the method includes receiving and processing the indication of user input at the service. Such processing may include filtering indications, augmenting indications with additional information or less information, forwarding aspects of the indication to another network device, and/or storing the indication in a data store.

At 524, the method includes forwarding the indication of user input from the service to the on-board device. The indication may be forwarded in original form or may be processed prior to forwarding.

At 526, the method includes receiving the indication over a wireless communication network, and operating according to the indication of user input at the on-board device. For example, the indication may direct the on-board interface device to perform one or more operations and/or may preclude the on-board interface device from performing one or more operations.

The above described methods and processes may be tied to a computing system including one or more computing devices. In particular, the methods and processes described herein may be implemented as one or more applications, service, application programming interfaces, computer libraries, and/or other suitable computer programs or instruction sets.

Figure 6:
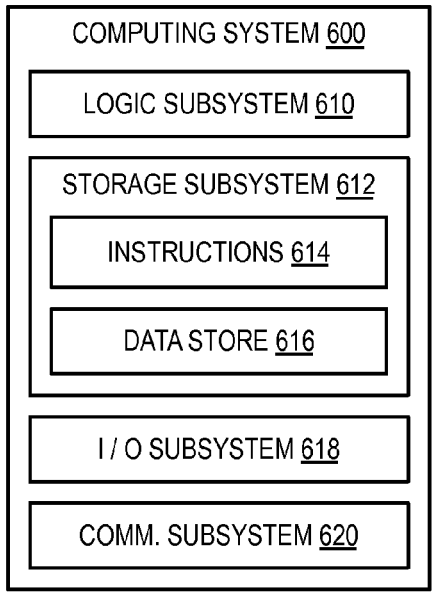
FIG. 6 is a schematic diagram depicting an example computing system.

FIG. 6 is a schematic diagram depicting an example computing system 600 that may perform one or more of the above described methods and processes. Computing system 600 is shown in simplified form. It is to be understood that virtually any computer architecture may be used without departing from the scope of this disclosure. Computing system 600 or portions thereof may take the form of one or more of a mainframe computer, a server computer, a computing device residing on-board a vehicle, a desktop computer, a laptop computer, a tablet computer, a home entertainment computer, a network computing device, a mobile computing device, a mobile communication device, a gaming device, etc.

Computing system 600 includes a logic subsystem 610 and an information storage subsystem 612. Computing system 600 may further include an input/output subsystem 618 and a communication subsystem 620. Logic subsystem 610 may include one or more physical devices configured to execute instructions, such as example instructions 614 held in storage subsystem 612. For example, the logic subsystem may be configured to execute that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem may include one or more processors that are configured to execute software instructions. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Storage subsystem 612 includes one or more physical, non-transitory, machines or devices configured to hold data in data store 616 and/or instructions 614 executable by the logic subsystem to implement the herein described methods and processes. When such methods and processes are implemented, the state of storage subsystem 612 may be transformed (e.g., to hold different data or other suitable forms of information).

Storage subsystem 612 may include removable media and/or built-in devices. Storage subsystem 612 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Storage subsystem 612 may include devices with one or more of the following characteristics: volatile, nonvolatile, dynamic, static, read/write, read-only, random access, sequential access, location addressable, file addressable, and content addressable. In at least some implementations, logic subsystem 610 and storage subsystem 612 may be integrated into one or more common devices, such as an application specific integrated circuit or a system on a chip.

It is to be appreciated that storage subsystem 612 includes one or more physical, non-transitory devices. In contrast, in at least some implementations and under select operating conditions, aspects of the instructions described herein may be propagated in a transitory fashion by a signal (e.g., an electromagnetic signal, an optical signal, etc.) that is not held by a physical device for at least a finite duration. Furthermore, data and/or other forms of information pertaining to the present disclosure may be propagated by a signal.

The terms "module" or "program" may be used to describe an aspect of a computing system that is implemented to perform one or more particular functions. In some cases, such a module or program may be instantiated via logic subsystem 610 executing instructions held by storage subsystem 612. It is to be understood that different modules or programs may be instantiated from the same application, service, code block, object, library, routine, API, function, etc. Likewise, the same module or program may be instantiated by different applications, services, code blocks, objects, routines, APIs, functions, etc. The terms "module" or "program" are meant to encompass individual or groups of executable files, data files, libraries, drivers, scripts, database records, etc.

It is to be appreciated that a "service", as used herein, may be an application program or other suitable instruction set executable across multiple sessions and available to one or more system components, programs, and/or other services. In at least some implementations, a service may run on a server or collection of servers responsive to a request from a client (e.g., an on-board computing device, a wireless mobile device, or other networked computing device).

Input/output subsystem 618 may include and/or otherwise interface with one or more input devices and/or output devices. Examples of input devices include a keyboard, keypad, touch-sensitive graphical display device, touch-panel, a computer mouse, a pointer device, a controller, an optical sensor, a motion and/or orientation sensor (e.g., an accelerometer, inertial sensor, gyroscope, tilt sensor, etc.), an auditory sensor, a microphone, etc. Examples of output devices include a graphical display device, a touch-sensitive graphical display device, an audio speaker, a haptic feedback device (e.g., a vibration motor), etc. When included, a graphical display device may be used to present a visual representation of data held by storage subsystem 612. As the herein described methods and processes change the data held by the storage subsystem, and thus transform the state of the storage subsystem, the state of the graphical display may likewise be transformed to visually represent changes in the underlying data.

Communication subsystem 620 may be configured to communicatively couple computing system 600 with one or more other computing devices or computing systems. Communication subsystem 620 may include wired and/or wireless communication devices compatible with one or more different communication protocols. As an example, the communication subsystem may be configured for communication via a wireless telephone network, a wireless local area network, a wired local area network, a wireless personal area network, a wired personal area network, a wireless wide area network, a wired wide area network, etc. In at least some implementations, the communication subsystem may enable computing system 600 to send and/or receive messages to and/or from other devices via a communications network such as the Internet, for example.

Figure 7:
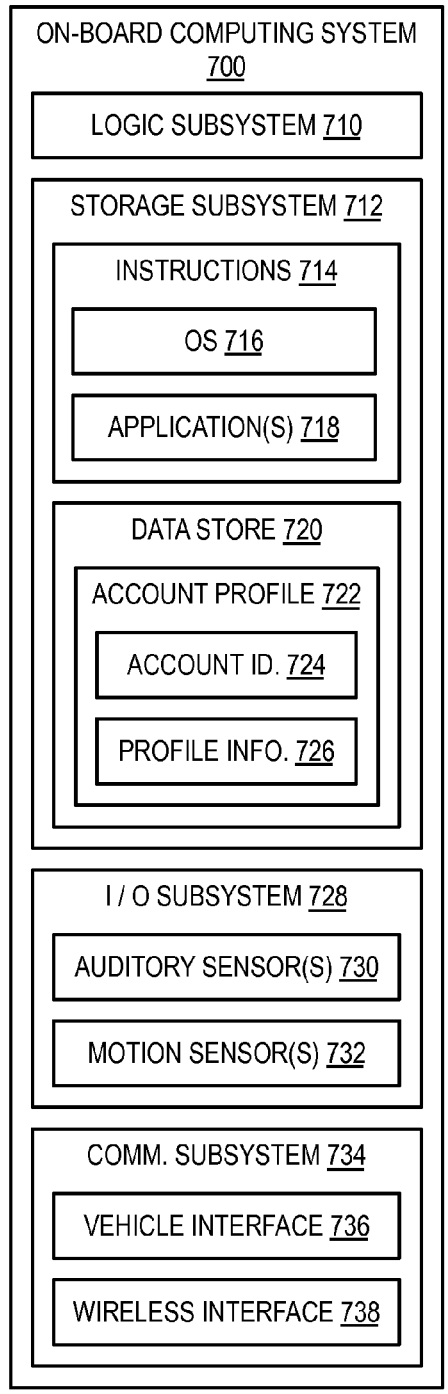
FIG. 7 is a schematic diagram depicting an example of an on-board computing system for a vehicle.

FIG. 7 is a schematic diagram depicting an example of an on-board computing system 700 for a vehicle. In one example, on-board computing system 700 may include or take the form of previously described on-board interface device 120 of FIG. 1. In such case, on-board interface device may take the form of a computing device that is independent of the on-board vehicle control system. As another example, on-board computing system 700 may include or take the form of a combination of previously described on-board interface device 120 and on-board vehicle control system 112 of FIG. 1.

On-board computing system 700 or a computing device thereof includes a logic subsystem 710, and a storage subsystem 712 having instructions 714 and a data store 720 stored thereon. Instructions 714 may include an operating system 716 and one or more application programs 718. Data store 720 may include one or more account profiles 722 that contain and/or are associated with a respective account identifier 724 and profile information 726. Account identifier 724 may take the form of an identifier received from a wireless-enabled device or may be associated with such an identifier. Data store 720 may further include raw data obtained from one or more sensors of the on-board interface device and/or an on-board vehicle control system. Raw data may be processed and stored in various formats in profile information 726, which may differ or vary among individual account profiles depending on user settings, applications states, etc.

On-board computing system 700 includes an input/output subsystem 728 that includes one or more auditory sensors 730 and/or one or more motion sensors 732. On-board computing system 700 includes a communication subsystem 734 that includes a vehicle interface 736 and one or more wireless interfaces 738. Vehicle interface 736 may include or take the form of previously described interface 122 of FIG. 1. A wireless interface may include a wireless transceiver and/or associated electronics that enable the on-board computing system to communicate with another device over a wireless communications network according to one or more wireless communications protocols.

Figure 8:
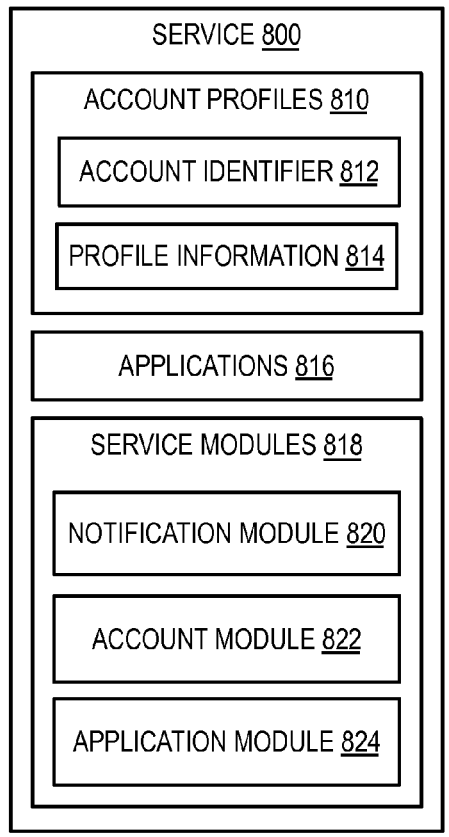
FIG. 8 is a schematic diagram depicting aspects of an example network service.

FIG. 8 is a schematic diagram depicting aspects of an example network service 800. As one example, network service 800 may include or take the form of previously described service 162 of FIG. 1. Network service 800 may maintain a data store includes one or more account profiles 810 that each contain and/or are associated with a respective account identifier 812 and profile information 814. Network service may further include raw data obtained from one or more on-board vehicle computing systems. Raw data may be processed and stored in various formats in profile information, which may differ or vary among individual account profiles depending on user settings, applications states, etc.

Service 800 may include one or more applications that may be distributed to and downloaded by one or more other computing devices. For example, one or more mobile computing devices, on-board interface devices, server devices, etc. may download application programs to augment the user experience provided by or through an on-board vehicle interface device. In at least some implementations, service 800 may host or otherwise provide an application program store or library from which application programs may be purchased or obtained by subscribers or members of the public.

Service 800 may include one or more service modules 818 for providing cloud based functionality. For example, a notification module 820 may receive, process, and forward event notifications and response messages between on-board computing devices and client devices. As another example, an account module 822 may associate profile information with account identifiers, and enable other computing devices, such as on-board computing systems and/or client devices to access account profile information via an application programming interface (API). As yet another example, an application module 824 may distribute and/or manage application programs operating at on-board computing systems and/or client devices. Application module 824 may support the ability for users to port applications, data, and/or preferences stored in a user account across multiple on-board computing systems responsive to such on-board computing systems detecting the presence of the user via their wireless-enabled device.

Figure 9:
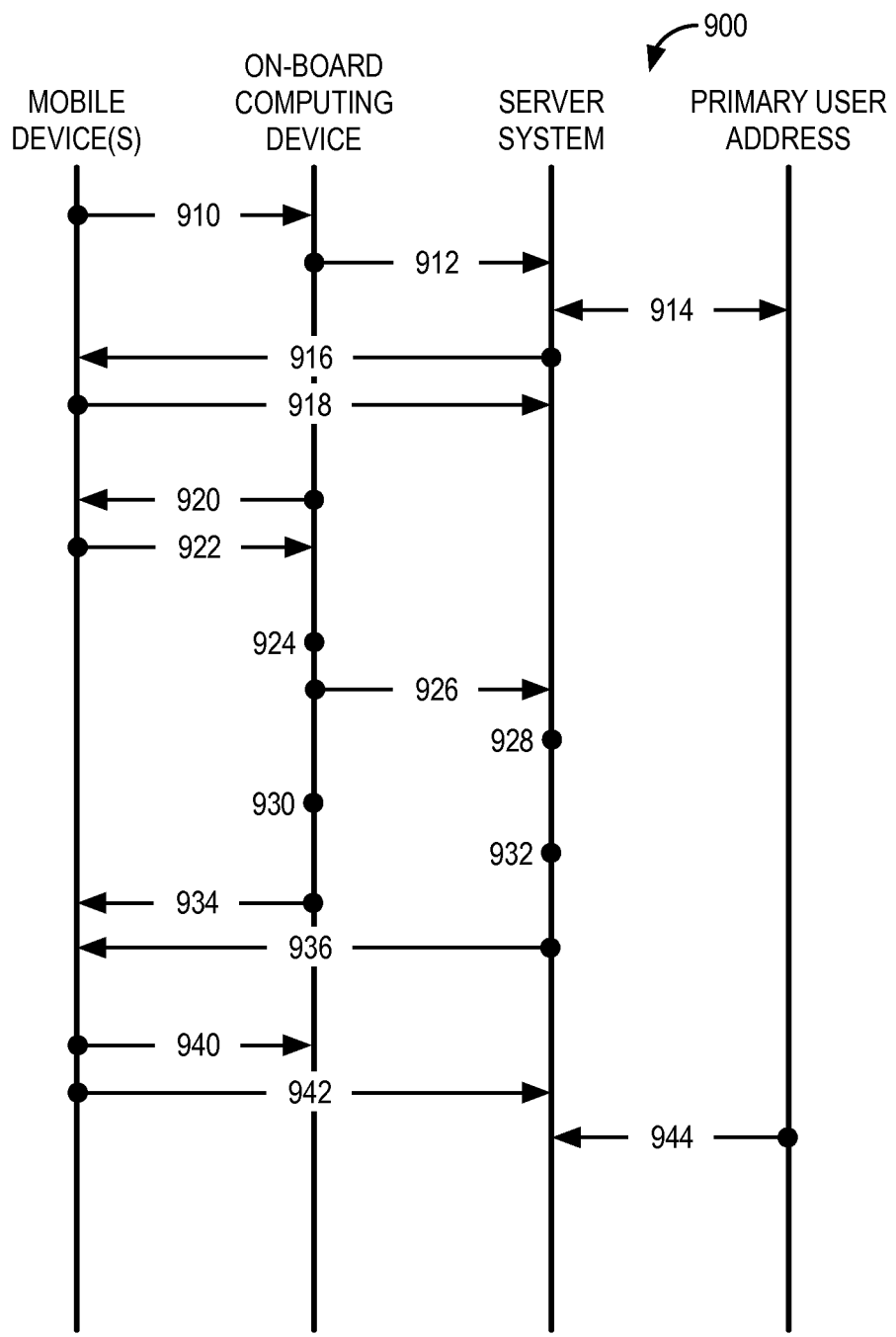
FIG. 9 is a flow diagram depicting an example use-scenario involving two detected wireless devices.

It is to be understood that the various methods and devices described herein may be used in combination with each other in a variety of ways. FIG. 9 provides an additional non-limiting example of how a computing device located on-board a vehicle (e.g., on-board interface device) may interact with a vehicle control system, remote server system, and multiple wireless devices carried by multiple different persons.

FIG. 9 is a flow diagram 900 depicting an example use-scenario involving two detected wireless devices. At 910, for each wireless device detected via a wireless transceiver of the computing device, the on-board computing device obtains an identifier from that wireless device over a wireless local area network or a wireless personal area network established with that wireless device via the wireless transceiver. At 912, the computing device reports detection of each wireless device to a network service hosted at a remote server system (e.g., a system of one or more network server devices) by transmitting the identifier or an indication of the identifier over a wireless wide area network.

For example, in the context of two wireless devices, the computing device may transmit one or more reporting messages directed to the network service that includes or indicates a first identifier of a first wireless device wirelessly detected by the computing device via a wireless local area network or a first wireless personal area network, and a second identifier of a second wireless device wirelessly detected as being present contemporaneously with the first wireless device by the computing device via the wireless local area network or a second wireless personal area network. The one or more reporting messages may further include or indicate a third identifier of the computing device located on-board the vehicle. Hence, the reporting messages provide an association of the detected wireless devices and the on-board computing device and/or vehicle.

The server system hosting the network service receives the one or more reporting messages over a wide area network (e.g., including a wireless wide area network component) originating from and transmitted by the computing device located on-board the vehicle. As previously discussed, the server system, responsive to receiving the one or more reporting messages, may reference a data store for a primary registered user of the computing device located on-board the vehicle. If neither the first identifier nor the second identifier are associated with the primary registered user in the data store or if permissions have not be granted for those identifiers, then the server system may transmit a notification message at 914 to a registered contact address of the primary registered user. A notification response message may originate from the registered contact address that indicates whether the user account associated with the first identifier and/or the user account associated with the second identifier is permitted to enter and/or operate the vehicle. The server system receives and processes the notification response message originating from the registered contact address or networked computing device authenticated with the server system for the primary registered user account.

At 916, the server system, responsive to receiving the one or more reporting messages, may transmit a vehicle operator status request message to the first wireless device and/or the second wireless device. The vehicle operator status request message directs each wireless device to prompt their respective users for an indication of the operator of the vehicle. As a non-limiting example, each wireless device may execute an application program that is paired with the on-board computing device and/or networked service. At 918, one or more of the wireless devices respond to the vehicle operator status request message by transmitting a vehicle operator status message to the remote server system hosting the network service. The server system receives a vehicle operator status message from each of the first wireless device and/or the second wireless device responsive to the vehicle operator status request message. The vehicle operator status message indicates either a user account associated with the first wireless device or a user account associated with the second wireless device as an operator of the vehicle.

Alternatively, at 920, the computing device located on-board the vehicle may communicate directly with the wireless devices (e.g., via a wireless local area network or wireless personal area networks) directing one or both of the first wireless device and the second wireless device to prompt their respective users for an indication of the operator of the vehicle. This indication may be received directly from the first wireless device and/or the second wireless device via a wireless local area network and/or a personal area network in the form of a vehicle operator status message, as indicated at 922.

Hence, in one example, a wireless network over which the vehicle operator status message is received may include a wireless wide area network, and the vehicle operator status message may be transmitted by and received from the remote server system responsive to reporting detection of the first wireless device and the second wireless device. In another example, a wireless network over which the vehicle operator status message is received may instead include a wireless local area network or a wireless personal area network, and the vehicle operator status message may be transmitted by and received from the first wireless device or the second wireless device in the case of two contemporaneous devices.

At 924, the computing device located on-board the vehicle may associate data received from the on-board vehicle control system via the wired communications link and/or data obtained from sensors of the computing device with a user account associated with the identifier or the indication of the identifier obtained from the wireless device. Typically, the computing device associates data with the user account indicated to be the vehicle operator. However, some implementations may associate data with user accounts indicated as a passenger of the vehicle. In one example, an association may be made at a local data store of the computing device located on-board the vehicle. This data may be processed and reported to mobile devices directly via local area network or personal area network links, or via the remote server system over a wide area network.

Alternatively or additionally, associating the data with the user account may include reporting the data or a processed form thereof to the network service for association with the identifier or the indication of the identifier in a data store of the remote server system. For example, at 926, the server system receives one or more data reports from the computing device located on-board the vehicle over the wide area network. In one example, the data reports may include a stream or time-based series of data reporting messages. At 928, the server system associates data reported by and received from the computing device located on-board the vehicle with the user account indicated as the operator of the vehicle.

At 930, the computing device located on-board the vehicle may reference a data store for an application program associated with a user account indicated as the operator of the vehicle, and may execute an instance of the application at the computing device. Alternatively or additionally, at 932, the server system may reference a data store for an application program associated with the user account indicated as the operator of the vehicle, and may execute an instance of the application program at the server system. An instance of an application program may be used to process data in any suitable way, and may be user-defined as a user preference, for example. The application program may be one of a plurality of application programs selectable by the user or purchased by the user.

As a non-limiting example, the application program processes the data by aggregating the data and reporting the aggregated data to a registered contact address associated with the user account indicated as the operator of the vehicle. For example, a wireless device may receive a report of the aggregated data from the on-board computing device or from the server system at 934 and 936, respectively. In at least some implementations, the server system may reference a data store for an application program associated with the user account indicated as the operator of the vehicle, and may transmit the application program or an identifier of the application program to the computing device located on-board the vehicle for execution of an instance of the application program at the computing device located on-board the vehicle 930.

At 940, user information in the form of user inputs, user preferences, user selections or other user information may be communicated from wireless devices to the computing device located on-board the vehicle over a local area network or a personal area network. The user information may be stored at a local data store of the computing device in association with the user account and/or may be reported to the server system for association with the user account at a data store of the server system. Alternatively, at 942, user information may be transmitted from the wireless devices or other suitable computing device (e.g., indicated at 944 in the context of user information of a primary user account accessing network via a computing device) to the server system for association with the appropriate user account, which may be subsequently reported by the server system to the appropriate computing device located on-board a vehicle.

The reporting of data obtained from the on-board vehicle control system and/or computing device located on-board the vehicle for the appropriate user account as well as the use of appropriate application programs and/or user information for that user account provides an enhanced user experience. Such data, application programs, and/or user information are made portable across multiple different computing devices or computing systems on-board multiple different vehicles. Wireless detection of user operated devices enables the on-board computing device and network service to automatically distinguish multiple users from each other, obtain vehicle operator status for those users, and to operate according to that vehicle operator status with minimal user interruption or interaction. In the case where a primary registered user is not detected as being present, a notification message may be used to inform that primary registered user of a vehicle entry or attempted entry by others to which that user may respond to permit or deny permission.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and sub-combinations of the various processes, systems and configurations, and other features, functions, acts, and/or properties disclosed herein, as well as any and all equivalents thereof. It should be understood that the disclosed embodiments are illustrative and not restrictive. Variations to the disclosed embodiments that fall within the metes and bounds of the claims, now or later presented, or the equivalence of such metes and bounds are embraced by the claims.

The invention claimed is:

1. A method performed by a computing device located on-board a vehicle and physically interfacing with an on-board vehicle control system of the vehicle via a wired communications link, the method comprising:
  detecting a motion event or an auditory event via one or more sensors of the computing device;
  responsive to detecting the motion event or the auditory event, initiating scanning to detect presence of one or more wireless devices via a wireless transceiver;
  for a wireless device of the one or more wireless devices detected via the wireless transceiver, obtaining an identifier from the wireless device over a wireless local area network or wireless personal area network via the wireless transceiver; and
  reporting detection of the wireless device from which the identifier was obtained to a network service hosted at a remote server system by transmitting the identifier or an indication of the identifier over a wireless wide area network.

2. The method of claim 1, further comprising:
  associating data received from the on-board vehicle control system via the wired communications link with a user account associated with the identifier or the indication of the identifier.

3. The method of claim 2, wherein associating the data with the user account includes reporting the data or a processed form thereof to the network service for association with the identifier or the indication of the identifier in a data store of the remote server system.

4. The method of claim 1, wherein the wireless device is a first wireless device detected via the wireless transceiver, and wherein the method further comprises:
  obtaining an additional identifier from a second wireless device over the wireless local area network or an additional wireless personal area network via the wireless transceiver, the second wireless device being detected as present contemporaneously with the first wireless device;
  reporting detection of the second wireless device to the remote server system by transmitting the additional identifier or an indication of the additional identifier over the wireless wide area network;
  receiving a vehicle operator status message over a wireless network, the vehicle operator status message indicating either a user account associated with the first wireless device or a user account associated with the second wireless device as being associated with an operator of the vehicle; and
  associating data received from the on-board vehicle control system via the wired communications link with the user account indicated by the vehicle operator status message.

5. The method of claim 4, wherein the wireless network over which the vehicle operator status message is received includes the wireless wide area network, and wherein the vehicle operator status message is transmitted by and received from the remote server system responsive to reporting detection of the first wireless device and the second wireless device.

6. The method of claim 4, wherein the wireless network over which the vehicle operator status message is received includes the wireless local area network or the wireless personal area network or the additional wireless personal area network, and wherein the vehicle operator status message is transmitted by and received from the first wireless device or the second wireless device.

7. The method of claim 4, further comprising:
  responsive to the second wireless device being detected as present contemporaneously with the first wireless device, directing one or both of the first wireless device and the second wireless device to initiate a prompt for a user to provide an indication of the operator of the vehicle.

8. The method of claim 1, further comprising:
  waking the wireless transceiver from a sleep state responsive to detecting the motion event or the auditory event prior to initiating said scanning via the wireless transceiver.

9. The method of claim 1, further comprising:
  retrieving profile information of a user account associated with the identifier or the indication of the identifier, the profile information indicating whether the user account is for a primary registered user of the computing device and/or the vehicle; and
  if the user account is not for the primary registered user, directing an event notification to a designated point of contact associated with the vehicle and/or the computing device located on-board the vehicle.

10. A method performed by a server system, the method comprising:
  receiving one or more reporting messages over a wide area network originating from and transmitted by a computing device located on-board a vehicle and physically interfacing with an on-board vehicle control system of the vehicle via a wired communications link, the one or more reporting messages including or indicating:
    a first identifier of a first wireless device wirelessly detected by the computing device via a wireless local area network or a first wireless personal area network, and
    a second identifier of a second wireless device wirelessly detected as being present contemporaneously with the first wireless device by the computing device via the wireless local area network or a second wireless personal area network; and
  responsive to receiving the one or more reporting messages, transmitting a vehicle operator status request message to the first wireless device and the second wireless device, the vehicle operator status request message directing the first wireless device and the second wireless device to initiate a prompt for a user to provide an indication of an operator of the vehicle.

11. The method of claim 10, further comprising:
  receiving a vehicle operator status message from the first wireless device and/or the second wireless device responsive to the vehicle operator status request message, the vehicle operator status message indicating either a user account associated with the first wireless device or a user account associated with the second wireless device as being associated with the operator of the vehicle.

12. The method of claim 11, further comprising:
  associating data reported by and received from the computing device located on-board the vehicle with the user account indicated as being associated with the operator of the vehicle.

13. The method of claim 11, further comprising:
  referencing a data store for an application program associated with the user account indicated as being associated with the operator of the vehicle; and
  executing the application program at the server system, wherein execution of the application program causes the server system to process data reported by and received from the computing device located on-board the vehicle.

14. The method of claim 13, wherein execution of the application program causes the server system to process the data by aggregating the data and reporting the aggregated data to a registered contact address associated with the user account indicated as being associated with the operator of the vehicle.

15. The method of claim 11, further comprising:
referencing a data store for an application program associated with the user account indicated as being associated with the operator of the vehicle; and
transmitting the application program or an identifier of the application program to the computing device located on-board the vehicle for execution of the application program at the computing device located on-board the vehicle.

16. The method of claim 10, wherein the one or more reporting messages include or indicate a third identifier of the computing device located on-board the vehicle; and
wherein the method further comprises, responsive to receiving the one or more messages, referencing a data store for a primary registered user of the computing device located on-board the vehicle;
if neither the first identifier nor the second identifier are associated with the primary registered user in the data store, then transmitting a notification message to a registered contact address of the primary registered user.

17. The method of claim 16, wherein the one or more reporting messages originate from and are transmitted by the computing device located on-board the vehicle following detection of a motion event or an auditory event; and
wherein the notification message indicates detection of the motion event or auditory event at the vehicle, and further indicates a user account associated with the first identifier and/or a user account associated with the second identifier.

18. The method of claim 16, further comprising:
receiving a notification response message originating from the registered contact address, the notification response message indicating whether a user account associated with the first identifier and/or a user account associated with the second identifier is associated with a user permitted to enter and/or operate the vehicle.

19. A computing device located on-board a vehicle and physically interfacing with an on-board vehicle control system of the vehicle via a wired communications link, the computing device comprising:
one or more motion sensors to detect a motion event;
a vehicle interface to interface with the vehicle control system via the wired communications link;
a communications subsystem to communicate with wireless devices via a local area network or personal area network;
a logic subsystem to execute instructions;
a storage subsystem having instructions stored thereon executable by the logic subsystem to:
responsive to detection of a motion event via the one or more motion sensors, wake a wireless transceiver from a sleep state and initiate a scan for wireless devices via the wireless transceiver;
for each wireless device detected via the wireless transceiver, obtain an identifier from that wireless device over a wireless local area network or a wireless personal area network established with that wireless device via the wireless transceiver;
if two or more wireless devices are detected via the wireless transceiver, then receive a vehicle operator status message, the vehicle operator status message indicating either a user account associated with a first wireless device or a user account associated with a second wireless device as being associated with an operator of the vehicle; and
receive data from the on-board vehicle control system via the wired communications link; and
associate the data received from the on-board vehicle control system via the wired communications link with the user account indicated as being associated with the operator of the vehicle.

20. The computing device of claim 19, wherein the instructions are further executable by the logic subsystem to:
report detection of the two or more wireless devices to a network service hosted at a remote server system by transmitting an identifier or an indication of the identifier for each wireless device over a wireless wide area network via the communications subsystem; and
receive the vehicle operator status message from the network service over the wireless wide area network via the communications subsystem.

* * * * *